UNITED STATES PATENT OFFICE.

GEORG VON ARCO AND ALEXANDER MEISSNER, OF BERLIN, GERMANY.

HIGH-FREQUENCY GENERATOR FOR TELEGRAPHY AND TELEPHONY.

1,314,101.   Specification of Letters Patent.   Patented Aug. 26, 1919.

Original application filed March 6, 1914, Serial No. 822,901. Divided and this application filed March 23, 1917. Serial No. 156,695.

*To all whom it may concern:*

Be it known that we, GEORG VON ARCO and ALEXANDER MEISSNER, subjects of the German and Austrian Emperors, respectively, and both residing at Berlin, Germany, have invented certain new and useful Improvements in High-Frequency Generators for Telegraphy and Telephony, of which the following is a specification.

High frequency oscillations which have been heretofore used in transmitting stations for wireless telegraphy and telephony, have been produced heretofore chiefly by means of sparks or electric arcs. For quite some time attempts have also been made to produce currents of such high frequencies directly in the rotating generators and the advantage was expected to more conveniently and economically generate the necessary large amount of energy for stations having very long ranges. The early experiments in this direction, however, have been unsuccessful, since it has not been possible to produce appreciable amounts of energy in the high frequency generators. So far as recent experimenters have succeeded in constructing high frequency generators yielding appreciable amounts of energy, they have succeeded only with very expensive machines. Besides, such machines constructed heretofore have shown a number of technical disadvantages, the principal of which is that it is possible to vary the wave lengths within wide limits, such as is necessary in most intances in transmitting stations, only by controlling the revolution number of the machine. This results, however, in a very uneconomical operation of the generator. Moreover, great difficulties have been encountered in stations attempting to transmit a large amount of energy in such manner, in controlling the high frequency currents for the purpose of producing signals or speech, because it was necessary to directly influence and interrupt the strong high frequency currents for this purpose.

The means for overcoming these difficulties have been disclosed in our co-pending application, Serial No. 822,901 filed March 6, 1914, patented May 21, 1918, No. 1,267,018, from which the present application has been divided.

The particular object of the invention disclosed in the present application is to overcome certain difficulties, encountered heretofore in constructing a suitable generator capable of a substantial energy output at such frequencies, that only a few times nfultiplication of the generated frequency is necessary in order to obtain the desired frequency at which the energy is radiated by the antenna.

Experiments have proven that it is possible to obtain an increase of frequency amounting to any desired multiple of the fundamental frequency produced by the generator by means of only a few sets of frequency changers, such as are disclosed and described in their circuit arrangement in the above mentioned parent application. As has been described and shown therein, it is possible, when properly arranging such changers, to obtain an economically operating station, if a fundamental frequency is chosen of the order from 5000 to 15000 periods per second. While this is a comparatively low frequency, when speaking of radio frequencies, still at such frequencies the generator can be built at considerably smaller cost than a machine which generates current at the usual antenna frequencies.

The particular novel features of our generator are illustrated more or less diagrammatically in the accompanying drawings in which.

After many experiments we have found that a type of generator, having an air gap, the longitudinal axis of which extends in the direction of the rotor axis, furnishes the best results. Owing to this construction it is possible to make the air gap very small, which is of great importance on account of the large number of poles. Besides using a small air gap also has the advantage of increasing the output of the machine. The use of an air gap, extending in the direction if the rotor axis is in contradistinction to the radially extending air gaps heretofore used in high frequency alternators.

Figure 1:
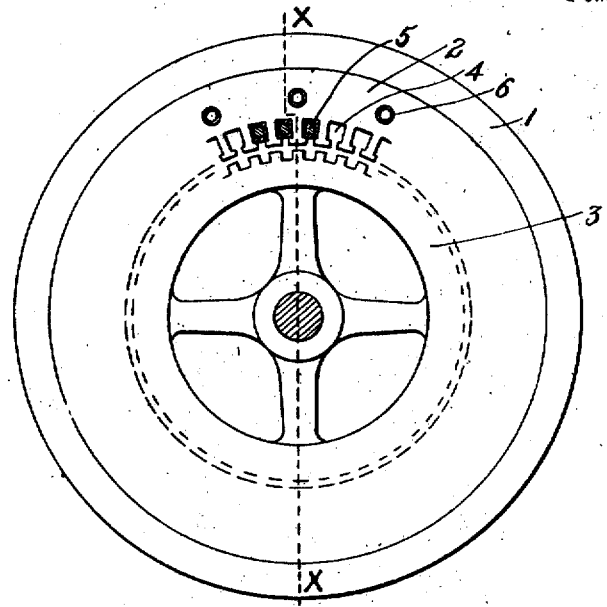
Figure 1 is a side elevation of the stator and rotor.

The rotor is indicated at 3 in Fig. 1 and consists of a toothed wheel of magnetic material without winding and is driven at very high speed. The poles which are formed by the teeth are all of equal polarity owing to the arrangement of the field excitation to be described later on. Thus high frequency alternating current is not produced as in ordinary machines by exposing the armature conductor to an alternating, but to a fluctuating field flux.

Figure 2:
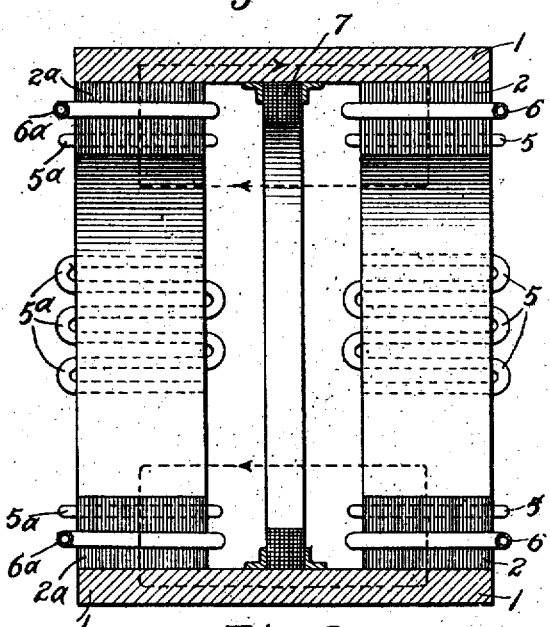
Fig. 2 is a vertical section of the stator on the line X—X in Fig. 1.

The manner in which this effect is obtained is shown in Fig. 2 and will be referred to in detail hereinafter. It is of particular advantage to symmetrically divide the whole stator in the middle at right angles to the rotor axis so that two stators of equal dimensions are obtained which have a common rotor. As shown in Fig. 2 a main solid, substantially cylindrical iron frame 1 carries within, suitably fastened to it, two laminated stator armature rings 2, 2ª, each provided with grooves 4 (Fig. 1) to receive their respective armature windings 5 and 5ª. Between the two stator rings, which are spaced apart, is arranged the field winding 7, suitably fastened to the frame ring 1. The rotor 3 is omitted in Fig. 2 but assumed to be of sufficient length to be common to both stators. When the field winding is energized, the rotor acts like a short, magnetized rod, whose magnetic flux is closed on its outside through the two laminated stators and through ring 1 as shown by the dotted lines with the arrows. Thus when the rotor turns, the magnetic flux in the rotor and stator teeth maintain the same direction at all times but varies in intensity in the teeth as the rotor teeth pass the stator teeth. By this variation in flux the alternating currents are induced in the stator windings.

Figure 3:
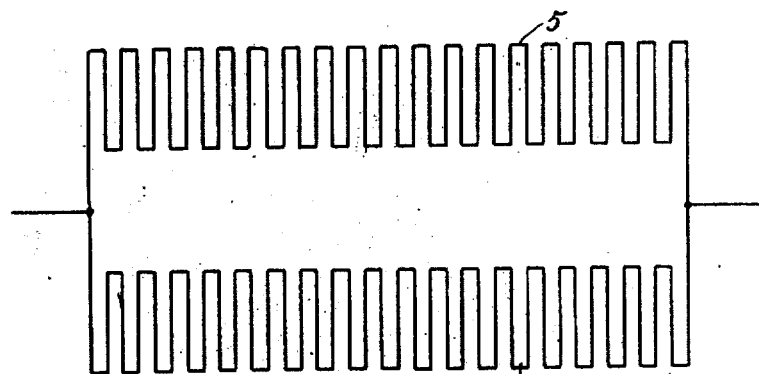
Figs. 3 and 4 are winding diagrams of the stator winding.

As shown in Fig. 2 the two stator rings 2 and 2ª have continuous wave winding. In this figure 5 and 5ª represent portions of the winding. We have found it best to arrange both windings electrically in parallel to each other so as to maintain the generator self-induction, and thus the generator potential, which may be produced by resonance within the winding, at a low value. This precaution is all the more necessary since in high frequency generators, on account of the large number of poles, the insulation of the armature winding is rendered difficult, compared with machines of ordinary commercial frequency. Fig. 3 shows this parallel arrangement where 5 and 5ª diagrammatically represent the two stator windings.

Figure 4:
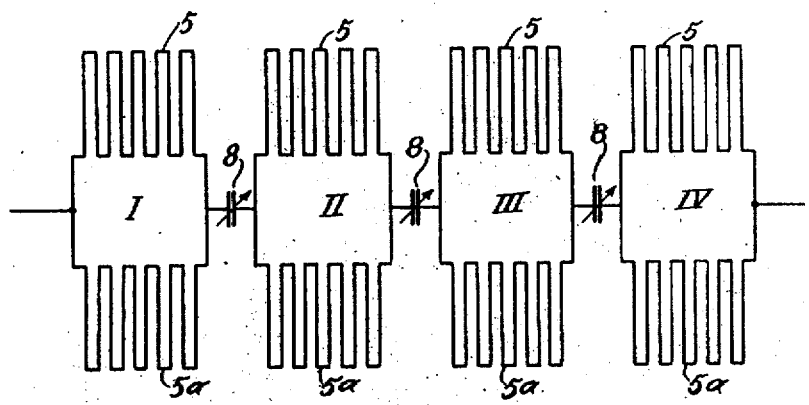

In order to further reduce the insulation difficulties due to rises in potential, each stator 2 and 2ª, in case of generators with large energy output, is divided into an equal number of sections as shown in Fig. 4, and the corresponding sections of the two stators are in each case arranged in parallel into one group and the groups thus formed are arranged in series, preferably with a condenser 8 placed between each group. In Fig. 4 four such groups I, II, III, IV, are shown. This arrangement materially reduces the equalizing currents which occur in the parallel arrangement of the two armature halves of the entire machine and which are due to slight unsymmetries in the winding. Moreover the maximum potential between the entire winding and the stator iron is not greater than the potential between an individual group and the iron.

In case of large energy output it is advisable to provide means for conducting cooling water through the stator iron, because the commonly employed air cooling produces an undesirable air friction at the high speeds at which machines of this character are run. As shown in Figs. 1 and 2, tubing 6 and 6ª, preferably of copper, is led in form of a wave winding, suitably spaced, through each stator, through which cooling water is pumped.

We claim:

In a radio transmission station of the character described, a high frequency generator of the inductor type having an air gap the longitudinal axis of which has the direction of the axis of the rotor, and having a plurality of stators and windings thereon, each stator winding being divided into a plurality of equal sections, the corresponding sections of all stators being joined into groups and being arranged within each group electrically in parallel to each other, all of said groups being electrically arranged in series, and condensers disposed between said groups, and a common rotor for said stators.

GEORG von ARCO.
ALEXANDER MEISSNER.

Witnesses:
HENRY HASPER,
ALLEN F. JENNINGS.